(12) United States Patent
Bangalore et al.

(10) Patent No.: US 8,223,748 B2
(45) Date of Patent: *Jul. 17, 2012

(54) ENHANCED REFRESH IN SIP NETWORK (75) Inventors: Manjunath Bangalore, San Jose, CA (US); Parameswaran Kumarasamy, San Jose, CA (US); Kavithadevi Parameswaran, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1461 days.

This patent is subject to a terminal disclaimer.

(21) Appl. No.: 11/453,443

(22) Filed: Jun. 14, 2006

(65) Prior Publication Data
US 2007/0294345 A1 Dec. 20, 2007

(51) Int. Cl.
*H04L 12/66* (2006.01)
(52) U.S. Cl. ........................... 370/352; 709/204
(58) Field of Classification Search .................. 370/352; 709/204
See application file for complete search history.

(56) References Cited

U.S. PATENT DOCUMENTS

| | | | |
|---|---|---|---|
| 6,950,445 B2 * | 9/2005 | Svanbro et al. | 370/477 |
| 7,822,858 B2 | 10/2010 | Kumarasamy et al. | |
| 2003/0128826 A1 | 7/2003 | Benini et al. | |
| 2004/0095938 A1 * | 5/2004 | Ryu | 370/392 |
| 2004/0103282 A1 * | 5/2004 | Meier et al. | 713/171 |
| 2004/0190502 A1 | 9/2004 | Sharma | |
| 2004/0210500 A1 | 10/2004 | Sobel et al. | |
| 2004/0246991 A1 | 12/2004 | Tsuzuki et al. | |
| 2005/0227685 A1 | 10/2005 | Costa Requena et al. | |
| 2006/0084454 A1 | 4/2006 | Sung et al. | |
| 2006/0089966 A1 | 4/2006 | Stille et al. | |
| 2006/0212589 A1 | 9/2006 | Hayer et al. | |
| 2007/0043876 A1 | 2/2007 | Varga et al. | |
| 2007/0054686 A1 | 3/2007 | Allen | |
| 2007/0253428 A1 | 11/2007 | Kumarasamy et al. | |
| 2008/0086566 A1 | 4/2008 | Kumarasamy | |

OTHER PUBLICATIONS

Donovan et al. RFC 4028: Session Timers in the Session Initiation Protocol (SIP). Network Working Group, Standards Track. Apr. 2005.*
Office Action mailed Feb. 27, 2009 U.S. Appl. No. 11/545,208; publication No. 2008-0086566.
S. Donovan, et al., "Session Timers in the Session Initiation Protocol (SIP)", Network Working Group, 27 pages, Apr. 2005.
Notice of Allowance mailed Jun. 28, 2010 in U.S. Appl. No. 11/411,367, 10 pages.
Non-final Office Action mailed Feb. 27, 2009 in U.S. Appl. No. 11/545,208, 22 pages.
Non-final Office Action mailed Apr. 5, 2010 in U.S. Appl. No. 11/545,208, 15 pages.
Final Office Action mailed Sep. 10, 2010 in U.S. Appl. No. 11/545,208, 16 pages.
Final Office Action mailed Oct. 21, 2009 in U.S. Appl. No. 11/545,208, 23 pages.
Notice of Allowance mailed Feb. 24, 2011 in U.S. Appl. No. 11/545,208, 8 pages.

\* cited by examiner

*Primary Examiner* — Asad M Nawaz
*Assistant Examiner* — Justin N Mullen
(74) *Attorney, Agent, or Firm* — Fish & Richardson P.C.

(57) ABSTRACT

Embodiments of the present invention provide techniques for refreshing a session. A session is refreshed using a refresh message that is enhanced for a refresh. For example, the refresh message does not include an SDP or any other message body. The message includes only a reduced header. This reduces time spent building and parsing the refresh message. Also, less bandwidth is used in sending the refresh messages.

26 Claims, 6 Drawing Sheets

INVITE sip:bob@biloxi.example.com SIP/2.0
       Via: SIP/2.0/UDP pc33.atlanta.example.com;branch=z9hG4bKnas
302 ⌒ Allow: INVITE, ACK, OPTIONS, CANCEL, BYE, REFRESH ⌒ 304
       Max-Forwards: 70
       To: Bob <sip:bob@biloxi.example.com>
       From: Alice <sip:alice@atlanta.example.com>;tag=1928301774
       Call-ID: a84b4c76e66710
       CSeq: 314159 INVITE
       Contact: <sip:alice@pc33.atlanta.example.com>
       Content-Type: application/sdp v=0
       o=CiscoSystemsSIP-GW-UserAgent 5140 9698 IN IP4 1.7.56.76
       s=SIP Call
       t=0 0
       m=audio 17012 RTP/AVP 0 8 18 9 4 15 101
       c=IN IP4 1.7.56.76
       a=rtpmap:0 PCMU/8000
       a=fmtp:0 annexb=no
       a=rtpmap:8 PCMA/8000
       a=fmtp:8 annexb=no
306    a=rtpmap:18 G729/8000
       a=fmtp:18 annexb=yes
       a=rtpmap:9 G722/8000
       a=fmtp:9 annexb=no
       a=rtpmap:4 G723/8000
       a=fmtp:4 annexb=no
       a=rtpmap:15 G728/8000
       a=fmtp:15 annexb=no
       a=rtpmap:101 telephone-event/8000
       a=fmtp:101 0-16
```

SIP/2.0 200 OK
         Via: SIP/2.0/UDP pc33.atlanta.example.com;branch=z9hG4bKnas
308 ~~ Allow: INVITE, ACK, OPTIONS, CANCEL, BYE, REFRESH ~~ 310
         To: Bob <sip:bob@biloxi.example.com>;tag=9as888nd
         From: Alice <sip:alice@atlanta.example.com>;tag=1928301774
         Call-ID: a84b4c76e66710
         CSeq: 314161 INVITE
         Contact: <sip:bob@192.0.2.4>
         Content-Type: application/sdp ⎧ v=0
       ⎪ o=CiscoSystemsSIP-GW-UserAgent 5140 9698 IN IP4 1.7.56.77
       ⎪ s=SIP Call
       ⎪ t=0 0
  312  ⎨ m=audio 17014 RTP/AVP 0 101
       ⎪ c=IN IP4 1.7.56.77
       ⎪ a=rtpmap:0 PCMU/8000
       ⎪ a=rtpmap:101 telephone-event/8000
       ⎩ a=fmtp:101 0-16
```

502 — REFRESH SIP/2.0
504 — To: Bob <sip:bob@biloxi.com>;tag=a6c85cf
506 — From: Alice <sip:alice@atlanta.com>;tag=1928301774
508 — Call-ID: a84b4c76e66710@pc33.atlanta.com
510 — CSeq: 10 REFRESH
                    └─ 512

502 — SIP/2.0 200 OK
504 — To: Bob <sip:bob@biloxi.com>;tag=a6c85cf
506 — From: Alice <sip:alice@atlanta.com>;tag=1928301774
508 — Call-ID: a84b4c76e66710@pc33.atlanta.com
510 — CSeq: 10 REFRESH
                    └─ 512

502 — SIP/2.0 481 Call/transaction does not exist
504 — To: Bob <sip:bob@biloxi.com>;tag=a6c85cf
506 — From: Alice <sip:alice@atlanta.com>;tag=1928301774
508 — Call-ID: a84b4c76e66710@pc33.atlanta.com
510 — CSeq: 10 REFRESH
                    └─ 512

*Fig. 5C*

ENHANCED REFRESH IN SIP NETWORK

BACKGROUND OF THE INVENTION

Embodiments of the present invention generally relate to telecommunications and more specifically to techniques for providing an enhanced refresh in a SIP network.

Voice-over Internet Protocol (VoIP) has become popular and prevalent for communications. When a communication between two peers occurs, a session is created for the communication. As VoIP networks evolve into large end-to-end networks, messages, such as session initiation protocol (SIP) messages, increasingly have to traverse a larger number of intermediate hops before reaching a final end point. With unpredictable IP network delays and packet loss, the chances of losing a SIP message are high. This occurs especially if user datagram protocol (UDP) or any other unreliable protocol is used to send messages. When a SIP message is lost, this may lead to a hanging SIP session. A hanging SIP session is a session on one side of the communication that a peer thinks is active but is not active on the other side.

To address the issue of hanging SIP sessions, session refresh mechanisms are used. A SIP session is refreshed by sending SIP messages periodically. Refreshes in SIP can be expensive particularly if there is no change to a session. SIP sessions may be refreshed by sending messages typically used in a dialog, such as UPDATE, RE-INVITE, OPTIONS/200 OK, etc. These in-dialog messages are sent as a ping to see if the session is still active. If a response is received, then it is assumed the session is active. These messages are typically bulky in that they include a full header and body (e.g. session description protocol (SDP) or extensible markup language (XML) information). This is because they were not designed for a refresh. Rather, they were originally designed to perform other functions and thus, the format and requirements for content to be included in the messages do not take into account a mechanism for a pure refresh. For example, an INVITE message is typically used to request a connection to a device. However, the INVITE message may be used to refresh a session in that the INVITE message is sent for a session and if a response is received for the INVITE message, such as a 200 OK message, it is assumed the session is active. SIP requires that the INVITE message include certain fields in the header and also an SDP.

Accordingly, parsing and transporting these messages just for a refresh purpose includes a lot of overhead. For example, a refreshes has to parse the entire header and SDP when the message is received. Also, transporting the messages results in significant network bandwidth consumption over time. Accordingly, the above method of refreshing sessions is processing-intensive and also uses valuable network bandwidth. Further, the processing resources/bandwidth used is magnified when the messages have to pass through other SIP devices, such as SIP servers and user agents participating in the session.

DETAILED DESCRIPTION OF EMBODIMENTS OF THE INVENTION

Embodiments of the present invention provide techniques for refreshing a session. A session is refreshed using a message that is enhanced purely for refresh purposes. For example, the refresh message does not include an SDP or any other message body. The message includes only a reduced header. This reduces time spent building and parsing the refresh message. Also, less bandwidth is used in sending the refresh messages.

A negotiation between a refresher and refreshes occurs to determine if each supports the enhanced refresh method. If a refresh method is supported, then a refresher generates a refresh message for a session. The refresh message may not include an SDP and also includes a reduced header. For example, the header may include only mandatory fields. The refresh message is sent to the refreshee, which can then determine if the session is active. The refreshee then sends a response message indicating whether the session is active or not. The response message may not include an SDP either and also includes a reduced header.

Figure 1:
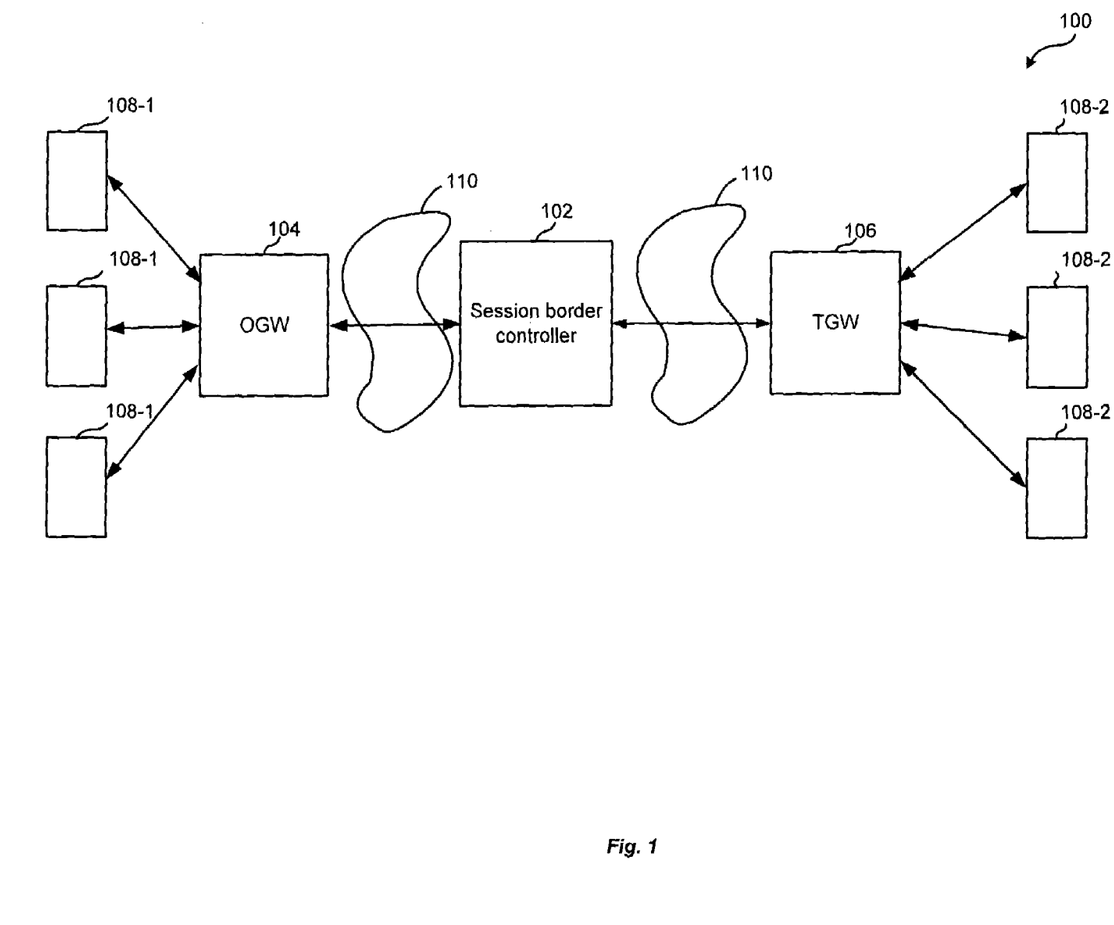
FIG. 1 depicts a system for providing an enhanced refresh of sessions according to one embodiment of the present invention.

FIG. 1 depicts a system 100 for providing an enhanced refresh of sessions according to one embodiment of the present invention. As shown, a session border controller (SBC) 102, originating gateway (OGW) 104, terminating gateway (TGW) 106, end devices 108, and network 110 are provided. Communications may be routed between a specific end device 108-1 and a specific end device 108-2. A session is created for the communications that are routed between originating gateway 104 and terminating gateway 106 for end device 108-1 and end device 108-2. Many sessions may be created by different end devices 108-1 and 108-2 to communicate. Session Border Controller 102 keeps track of which sessions are established between originating gateway 104 and terminating gateway 106.

End devices 108 may be any devices that can participate in a communication. For example, end devices may be IP telephones, public switch telephone network (PSTN) devices, computers, instant message clients, soft phones, or any other devices that can participate in a communication.

Originating gateway 104 may be any network device configured to manage communications with end devices 108-1. In one embodiment, gateway 104 manages a set of end devices 108. Originating gateway 104 may be the gateway that originates a communication.

Terminating gateway 106 may be any network device configured to manage communications with end devices 108-2. Terminating gateway 106 may be the gateway that receives a communication from originating gateway 104. Terminating gateway 106 may then send a communication to an end device 108-2. Although originating gateway 104 and terminating gateway 106 are referred to as "originating" and "terminating", it will be understood that communications may be flow in both directions. Thus, originating gateway 104 and terminating gateway 106 may originate and terminate communications.

Session border controller 102 is a network device configured to sit in between communications between originating gateway 104 and terminating gateway 106. Session border controller 102 keeps track of which set of sessions are established between originating gateway 104 and terminating gateway 106. Session border controller 102 may include IP-to-IP gateways, SIP proxies, IP-PBXs, media gateways, soft switches, Back-To-Back User Agents (B2BUAs), etc.

Network 110 may be any network. For example, network 110 may be an IP network. Session initiation protocol (SIP) may be used to send SIP messages between originating gateway 104 and terminating gateway 106. Although SIP is described, it will be understood that other protocols may be appreciated.

As SIP sessions are created, session border controller 102 stores a session identifier. The session may be active on both the originating gateway 104 and the terminating gateway 106. However, at some point, a session at originating gateway 104 and/or terminating gateway 106 may become inactive on one gateway but not the other. The session may be considered hanging in this case. A hanging session is where one side or both the sides of a communication think that a session is active but the session is inactive on one side or both the sides of the communication. For example, terminating gateway 106 may think that a session is active. However, the session may be inactive on originating gateway 104. The session may become inactive for different reasons. For example, a session may time-out and become inactive after a certain period of time. If signaling and/or media packets are lost in a communication, this may cause a time-out.

When hanging sessions occur, actions may be taken to clear the session. For example, a BYE message should be sent by terminating gateway 106 to end the session or the session can be forcibly torn down. This clears the hanging session from terminating gateway 106. Similarly other devices like session border controller 102 and originating gateway 104 can initiate a session clean-up. Before clearing the sessions, however, it is determined which sessions are hanging by using the enhanced refresh method.

Accordingly, embodiments of the present invention provide an enhanced refresh message for refreshing sessions. In one embodiment, a negotiation, using, for example, SIP INVITE and 200 OK messages, may be performed to determine if a refreshee and refresher support the bulk refresh. In one example, session border controller 102 may send an INVITE message to originating gateway 104 with a tag that indicates the enhanced refresh is supported. Originating gateway 104 sends a 200 OK message back to session border controller 102 with a tag that indicates it supports the enhanced refresh, if it does. If it does not, the 200 OK message does not include the tag indicating it supports enhanced refresh. Although, INVITE and 200 OK messages are described, it will be recognized that other SIP messages may be used to negotiate support for the enhanced refresh method, such as message used to create a dialog.

If the enhanced refresh method is supported, a refresher can then generate an enhanced refresh message. The enhanced refresh message includes less information than other SIP messages. For example, the enhanced refresh message does not include a body (e.g., SDP or XML text) and also includes a reduced header. The enhanced refresh message is sent to a refreshee, which can then refresh the session (i.e., determine if the session is active or not). The refreshee then sends a response message to the refresher indicating whether the session is active or not. The response message may not include a body and also includes a reduced header.

Accordingly, a method of providing an enhanced refresh cuts down on extra processing because parsing of the body and header is reduced. Also, bandwidth used is reduced as the size of the message is smaller. Further, the processing time and bandwidth saved is increased as session border controller 102 handles a larger number of calls. Also, when session border controller 102 is connected to multiple gateways 104, then the savings is multiplied by as many gateways 104 in which session border controller 102 is connected.

Figure 2:
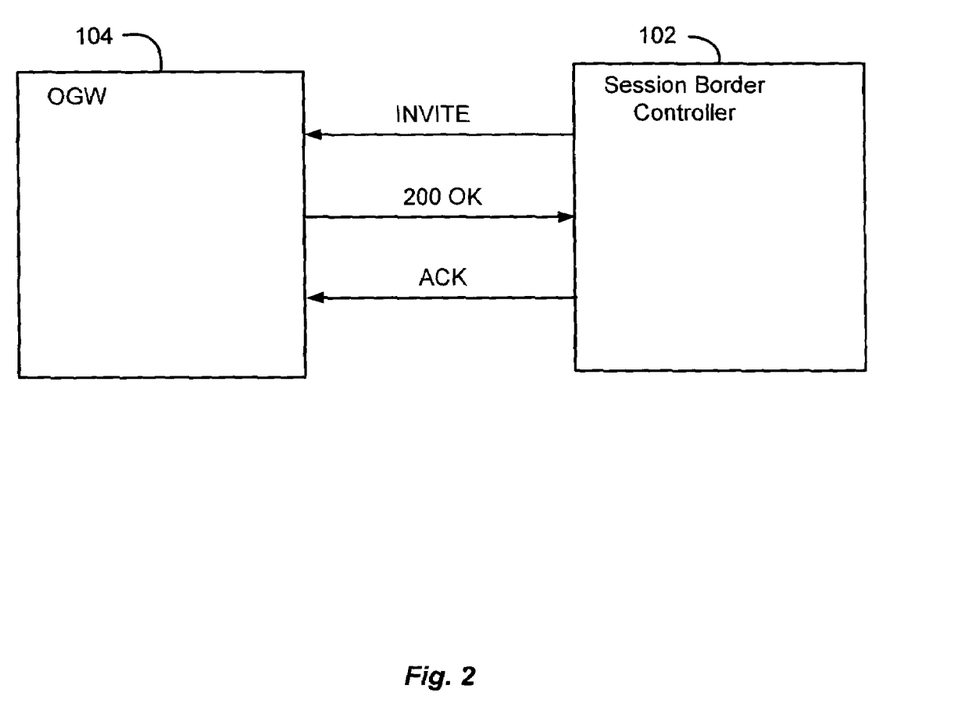
FIG. 2 depicts an example of a negotiation to determine if the enhanced refresh is supported according to one embodiment of the present invention.

FIG. 2 depicts an example of a negotiation to determine if the enhanced refresh is supported according to one embodiment of the present invention. In one embodiment, session border controller 102 may be a refresher that initiates the enhanced refresh and gateway 104 may be a refreshee that performs the refresh. Although the following will be discussed in the context of SBC 102, embodiments of the present invention may be use between any two SIP peers. Also, although session border controller 104 is described as being the refresher and gateway 104 is described as being the refreshee, it will be understood that the roles may be reversed. Also, other devices in system 100 may assume the roles of the refresher and refreshee.

In one embodiment, session border controller 102 sends a message to gateway 104 to determine if gateway 104 supports the enhanced refresh. In one embodiment, a SIP message may be sent, such as a SIP INVITE message. The SIP INVITE message includes an enhanced refreshed tag in a header field that indicates support for the enhanced refresh.

Figure 3A:
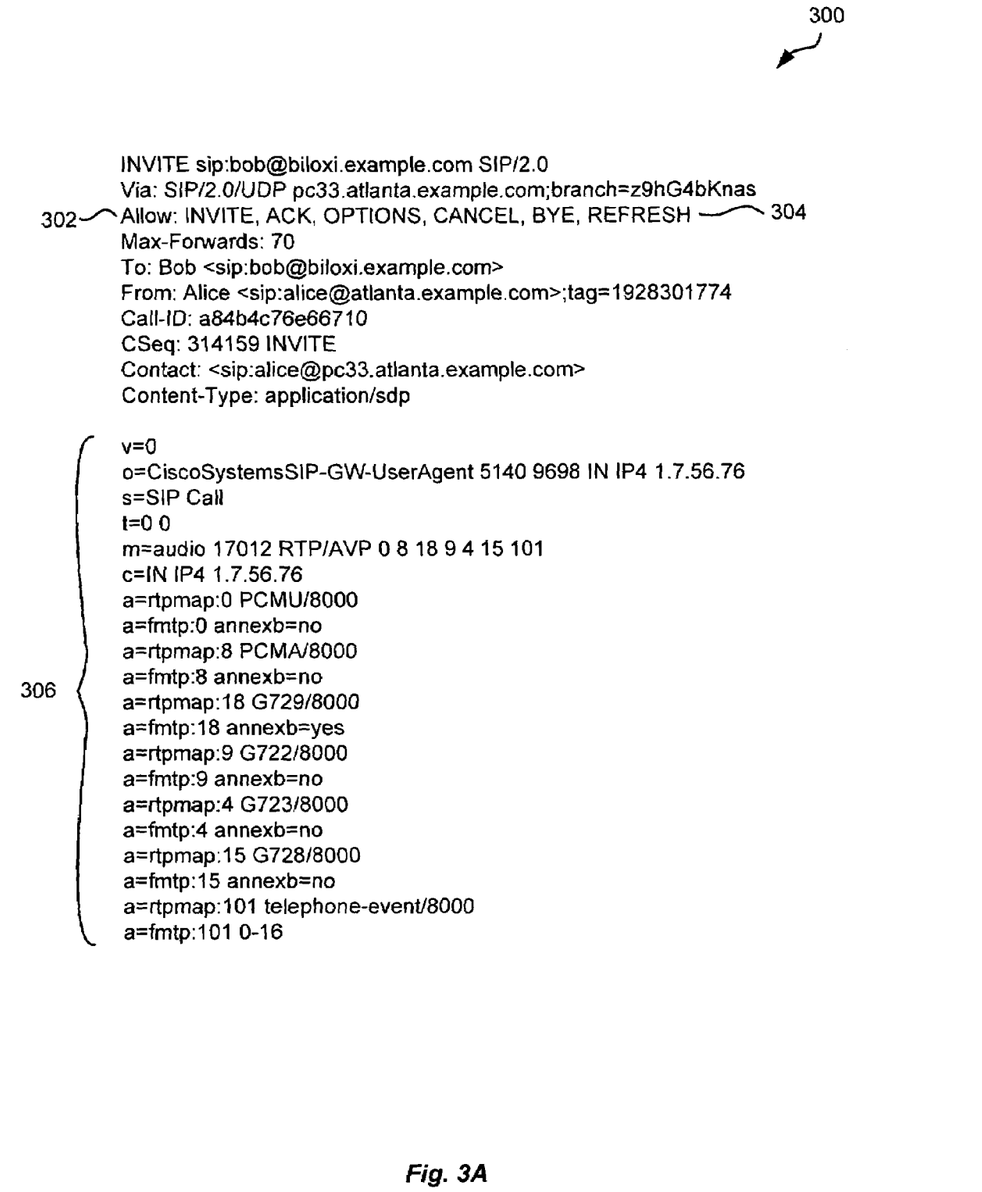
FIG. 3A shows an example of an INVITE message that may be sent according to one embodiment of the present invention.

FIG. 3A shows an example of an INVITE message 300 that may be sent according to one embodiment of the present invention. As shown, an allow header field 302 is provided in an INVITE message 300. Allow header field 302 includes features that are supported by session border controller 102. As shown, a tag 304 indicates that the option "REFRESH" is supported by session border controller 102. Other options that are supported and shown in Allow header field 302 include INVITE, ACK, OPTIONS, CANCEL, and BYE.

A body 306 is also included with this message as is required in SIP for an INVITE message. 1xx messages may then be exchanged between gateway 104 and SBC 102.

Gateway 104 may then send a message back to session border controller 102 that indicates whether or not the enhanced refresh is supported. If the enhanced refresh is supported, then a tag of "REFRESH" may be included in a header field in a 200 OK SIP message. An ACK may then be received.

Figure 3B:
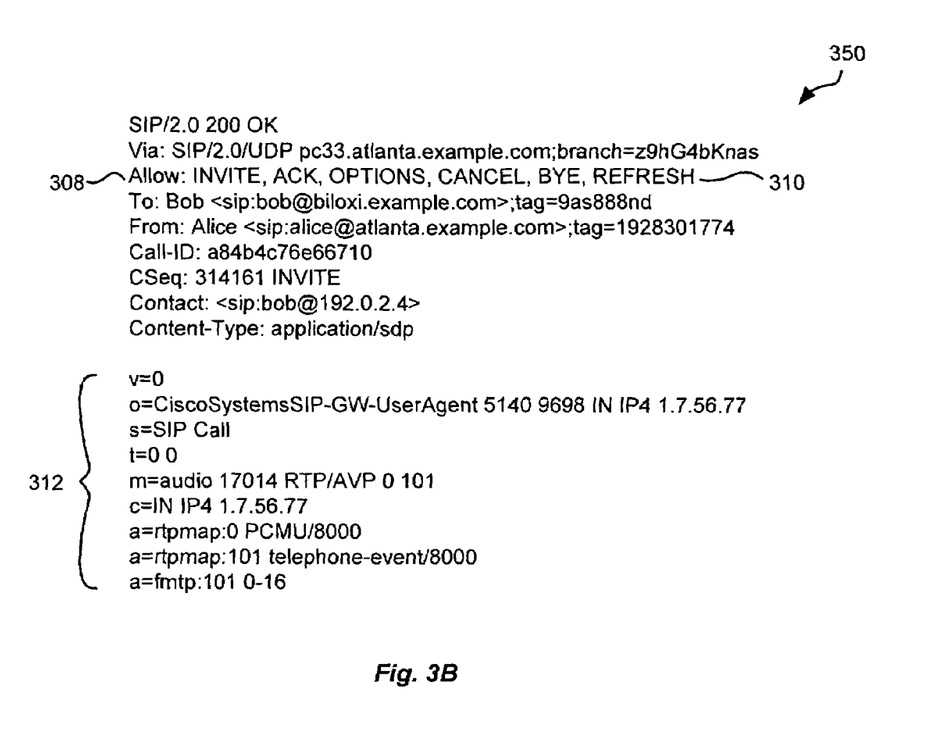
FIG. 3B shows an example of a 200 OK message according to one embodiment of the present invention.

FIG. 3B shows an example of a 200 OK message 350 according to one embodiment of the present invention. As shown, an Allow header field 308 includes a tag 310 of "REFRESH". Also, Allow header field 308 includes other features that are supported by gateway 104, such as INVITE, ACK, OPTIONS, CANCEL, and BYE. Further, a body 312 includes an SDP as is required by the SIP protocol for a 200 OK message.

Accordingly, if the enhanced refresh is supported by both session border control 102 and gateway 104, then an enhanced refresh may be performed. However, if gateway 104 does not include the REFRESH tag in a response, then sessions may be refreshed individually with full messages including a body and full header using messages, such as INVITE, SUBSCRIBE, etc.

Figure 4:
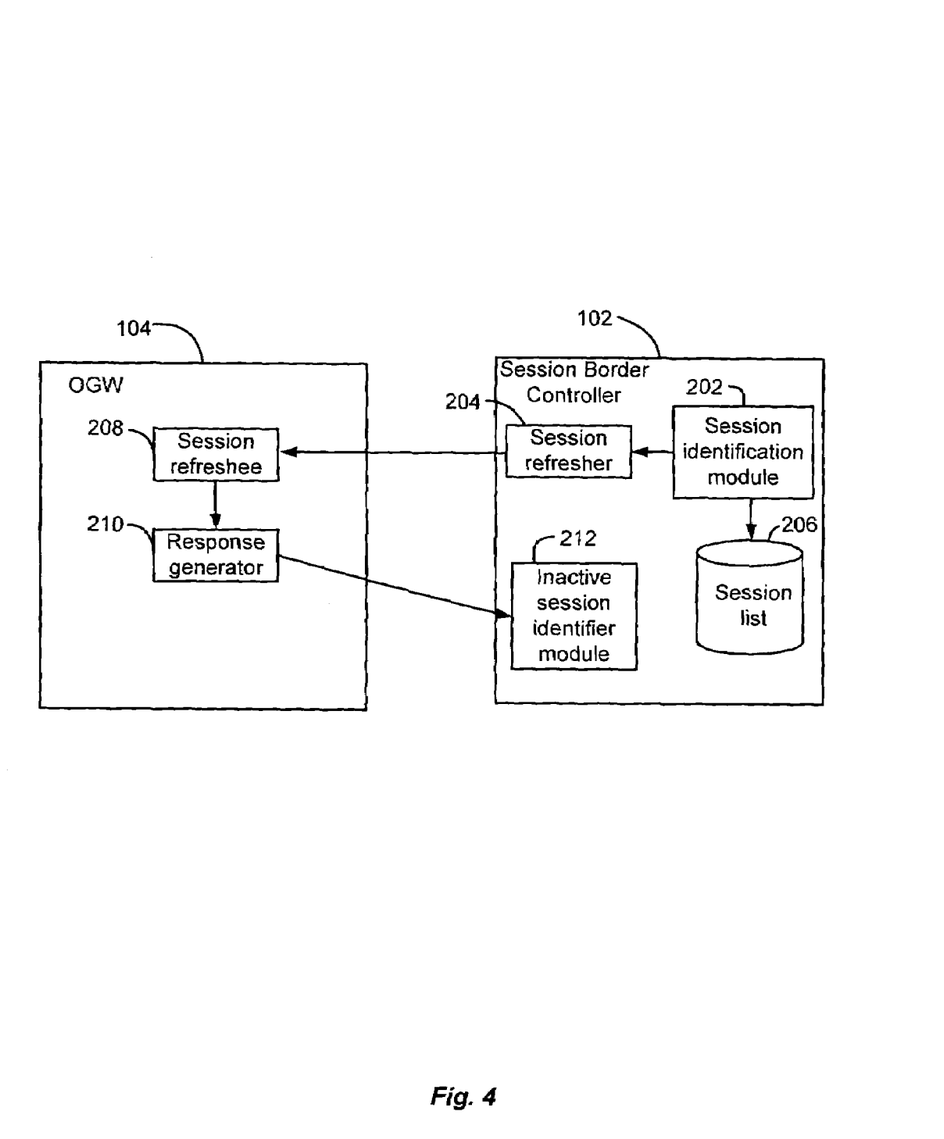
FIG. 4 depicts a more detailed embodiment of the system according to embodiments of the present invention.

FIG. 4 depicts a more detailed embodiment of system 100 according to embodiments of the present invention. As shown, session border controller 102 and originating gateway 104 are provided. For discussion purposes, the communication is assumed to be between session border controller 102 and originating gateway 104. However, terminating gateway 106 may include the same components as described with respect to originating gateway 104. Also, although session border controller 102 is shown as initiating the enhanced refresh, it will be understood that other devices in system 100 may initiate the enhanced refresh, such as originating gateway 104 and terminating gateway 106.

As shown, session border controller 102 includes a session identification module 202, a session refresher 204, and a session list 206. Session identification module 202 is configured to determine sessions that have been created between originating gateway 104 and terminating gateway 106. Session identification module 202 uses session identifiers that are stored in session list 206 when the sessions were created.

In one embodiment, as sessions are created and calls are placed between gateway 104 and session border controller 102 and/or terminating gateway 106, the negotiation as to whether enhanced refresh is supported may be performed during this messaging. Session refresher 204 may determine if the enhanced refresh message is supported for a session. If so, session refresher 204 then generates an enhanced refresh message.

The enhanced refresh message may not include a body. Also, a reduced header may be provided. For example, the reduced header may include only mandatory fields that are necessary for sending a SIP message. In one embodiment, the header includes a Message field followed by the dialog-identifier headers (From, To, Call ID, CSeq). This results in a lightweight message that is easy to build/parse and uses very little bandwidth to send.

Figure 5A:
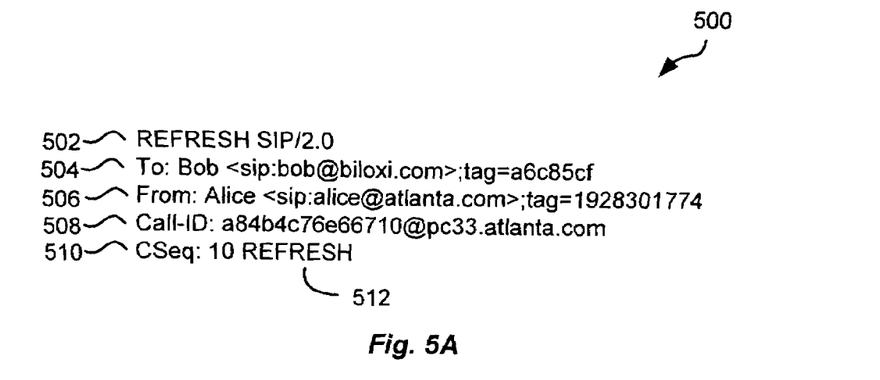
FIG. 5A depicts an enhanced refresh message according to one embodiment of the present invention.

FIG. 5A depicts an example of an enhanced refresh message 500 according to one embodiment of the present invention. As shown, a Message field 502, a To field 504, a From field 506, a Call-ID field 508, and a command sequence (CSeq) field 510 are included in the enhanced refresh message 500. Also, a body is not included in message 500.

Message field 502 indicates what type of message this is, i.e., an enhanced refresh message. From field 506 and To field 504 include identifiers for the original calling and called parties, respectively.

Call-ID field 508 identifies the session this enhanced refresh message is for. Accordingly, the session for the session identifier included should be refreshed. CSeq field 510 indicates the sequential number of a message sent in the session. A tag 512 of "REFRESH" indicates this message is for a refresh.

Because the body does not need to be included in the enhanced refresh message 500 and a reduced header is provided, less processing time is spent to build message 500. Also, because the SDP is not included and the header fields are reduced, bandwidth is saved in sending message 500 to session refreshee 208. This refresh message may be a message specifically for a refresh of a session. In one embodiment, the message may have no other uses in SIP. This is different from using an INVITE message for a refresh, where the INVITE message is used to initiate a call.

Referring back for FIG. 4, a session refreshee 208 of originating gateway 104 may receive the enhanced refresh message. Session refreshee 208 determines that the message is a refresh message based on Message field 502. To determine information needed to perform the refresh, session refreshee 208 does not need to parse a full header or a body. Rather, session refreshee 208 can determine the session identifier and then determine if the session for the identifier is active or not.

A response generator 210 then generates a response message. The response message indicates whether or not the session is active. Response generator 210 may build a response message that is enhanced in that it only includes mandatory header fields and also does not include a body. If the session is active, a response may be a 200 OK response message that is sent without a full header and body. If the session is not active, a 481 Call/Transaction does not exist is sent without a full header and body. Although these messages are described, it will be understood that other messages may be sent that indicate whether the session is active or not.

Figure 5B:
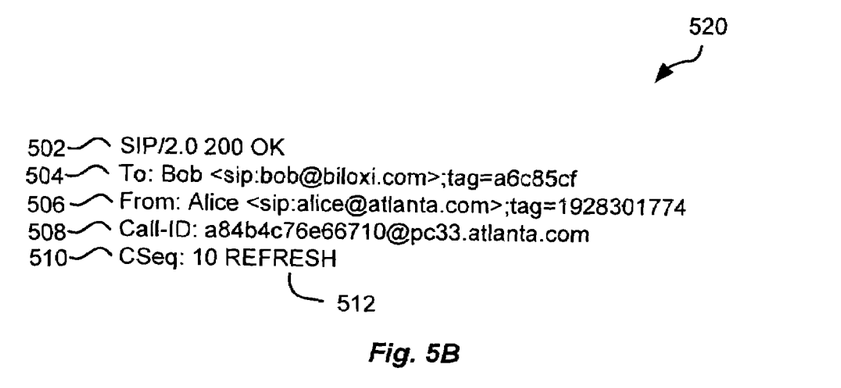
FIG. 5B shows a response message according to one embodiment of the present invention.

FIG. 5B shows an example of a response message 520 for indicating the session is active according to one embodiment of the present invention. This message is a 200 OK message indicating the session is active. As shown, a body is not included. Also, the same header fields are provided in response message 502 as found in enhanced refresh message 500. In call-ID field 508, the session identifier that was included in message 500 is included. Because the response message 502 does not include an SDP and includes a reduced number of header fields, processing in generating message 510 is saved and bandwidth is conserved in sending message 510 to an inactive session identifier module 212. A tag 502 of "REFRESH" is included in message 520. This is so the refresher can distinguish this 200 OK message as a response to the refresh message rather than a response to an INVITE message or other SIP message.

Inactive session identifier module 212 receives the response from response generator 210. Message 510 is parsed and it is determined if the session is active or not. Message 510 does not include a body so that does not need to be parsed and, in addition, the header is reduced and a large number of fields do not need to be parsed. Accordingly, it can be determined if the session is active or not with a minimal amount of parsing/processing.

In one embodiment, when a 200 OK message is received with a tag 512 of REFRESH, it is assumed the session identified in Call-ID field 508 is active.

If inactive session identifier module 212 determines that a session is inactive, then session border controller 102 may take actions to clear any discrepancies for inactive sessions. For example, session border controller 102 may send a BYE message to terminating gateway 106 for the inactive sessions identified. Also, originating gateway 104 may send a BYE message for the inactive sessions. Accordingly, terminating gateway 106 is notified and can end the inactive sessions itself.

Figure 5C:
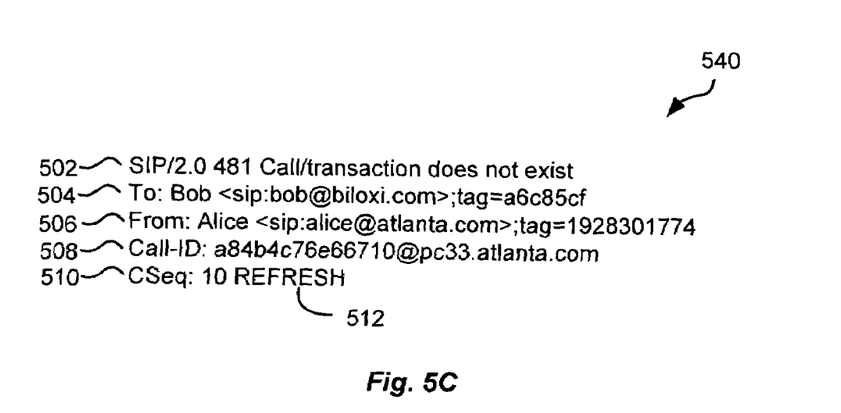
FIG. 5C shows another example of a response message according to one embodiment of the present invention.

If the session is not active, a response message may be a failure message, such as a 481 Call/Transaction does not exist. FIG. 5C shows a response message 540 for indicating the session is inactive according to one embodiment of the present invention. Response message 540 includes message field 502, To field 504, From field 506, Call-ID field 508 and CSeq field 510.

In one embodiment, when the 481 Call/Transaction does not exist message is received with a tag 512 of REFRESH, it is assumed the session identified in Call-ID field 508 is inactive.

Other methods of determining that a session is active or inactive may be appreciated. For example, a tag may be included in a message that indicates whether the session is active or not. Thus, two different types of messages do not need to be sent. Also, a response message may not be sent back if the session is not active. Session border controller 102 may then determine that the session is not active if a response is not received within a certain amount of time.

Although the above is described as sending an enhanced session refresh message for one session, it will be recognized that multiple sessions may be refreshed using the same enhanced refresh message 500. For example, multiple session identifiers may be included in message 500 and refreshed. A response that indicates which sessions are active or not may then be received. In one embodiment, further details are described in U.S. patent application Ser. No. 11/411,367, entitled "Techniques for Bulk Refresh of Sessions in IP Networks", filed Apr. 26, 2006, which is incorporated by reference in its entirety for all purposes.

Embodiments of the present invention provide many advantages. For example, an efficient way of refreshing SIP sessions is provided. Less processing is spent building the refresh message. The reduced message size also uses less bandwidth and requires less parsing at the refreshee. Accordingly, resources (CPU/memory) on the SIP network involved in the session refresh are saved thus freeing up devices to handle a larger number of simultaneous calls. Further, there is a direct impact on network bandwidth use due to messages that are smaller. Accordingly, session border controllers 102 may handle more calls with multiple gateways 104 because of the processing and bandwidth that is saved using embodiments of the present invention.

Although the invention has been described with respect to specific embodiments thereof, these embodiments are merely illustrative, and not restrictive of the invention. For example, although SIP is described, it will be recognized that other protocols may be appreciated. Additionally, other devices than those described may use the enhanced refresh.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A method for refreshing a session, the method comprising:
    determining, by a first device, during a Session Initiation Protocol (SIP) session between the first device and a second device, whether a refresh method is supported by the second device by sending a negotiation message to the second device indicating that the refresh method is supported, wherein a device that supports the refresh method is configured to determine whether a SIP session is active or inactive, and wherein the first device is configured to send a message with a body when the refresh method is not supported;
    receiving, at the first device, a response from the second device indicating whether the second device supports the refresh method;
    based on the response from the second device indicating that the second device supports the refresh method, generating, using the first device, a first protocol message to initiate a refresh of the SIP session with the second device, wherein the first protocol message includes only a header configured with a refresh tag in a header field indicating that the first protocol message is a refresh message that is used to request a status of the SIP session;
    sending the first protocol message from the first device to the second device;
    receiving, using the first device and in response to the first protocol message, a second protocol message from the second device, wherein the second protocol message comprises a header and devoid of a body, the header of the second protocol message including the refresh tag and additional information indicating that the second protocol message is in response to the first protocol message; and
    determining, using the first device and based on the information included in the second protocol message, whether the SIP session is active or inactive.

2. The method of claim 1, wherein the refresh message includes a reduced header that only includes mandatory fields as defined in SIP.

3. The method of claim 1, wherein at least one of the first protocol message and the second protocol message does not include a session description protocol (SDP).

4. The method of claim 1, wherein the second protocol message is a first type of message if the session is active and a second type of message if the session is inactive.

5. The method of claim 4, wherein the first type of message is a modified version of a SIP 200 OK message and the second type of message is a modified version of a SIP 481 Call/Transaction does not exist message.

6. The method of claim 1, wherein the first protocol message includes a header comprising a message field, From field, TO field, call-ID field, and Cseq field, as defined in SIP.

7. A method for refreshing a session, the method comprising:
    receiving, by a second device, during a Session Initiation Protocol (SIP) session between a first device and the second device, a negotiation message from the first device indicating that a refresh method is supported by the first device, wherein a device that supports the refresh method is configured to determine whether a SIP session is active or inactive, and wherein the first device is configured to send a message with a body when the refresh method is not supported;
    sending, by a second device, a response message to the first device indicating whether the second device supports the refresh method;
    receiving, using the second device, a first protocol message from the first device, wherein the first protocol message includes only a header configured with a refresh tag in a header field indicating that the first protocol message is a refresh message that is used to request a status of the SIP session with the first device is requested;
    determining, using the second device and based on receiving the first protocol message, the status of the SIP session with the first device, wherein the status of the SIP session indicates whether the SIP session is active or inactive;
    generating, using the second device, a second protocol message, wherein the second protocol message comprises a header and devoid of a body, the header of the second protocol message including the refresh tag and additional information indicating that the second protocol message is in response to the first protocol message, the header of the second protocol message further indicating the status of the SIP session; and
    sending the second protocol message from the second device to the first device.

8. The method of claim 7, wherein the first protocol message and the second protocol message include a reduced header that only includes mandatory header fields as defined in SIP.

9. The method of claim 7, wherein the second protocol message is a first type of message if the session is active and a second type of message if the session is inactive.

10. The method of claim 9, wherein the first type of message is a modified version of a SIP 200 OK message and the second type of message is a modified version of a SIP 481 Call/Transaction does not exist message.

11. The method of claim 7, wherein at least one of the first protocol message and the second protocol message does not include an SDP.

12. The method of claim 7, wherein the first protocol message includes a header comprising a message field, From field, TO field, call-ID field, and Cseq field as defined in SIP.

13. A network device configured to refresh a session, the network device comprising:
- a processor;
- a non-transitory computer readable storage medium; and
- one or more instructions configured to be stored in the non-transitory computer readable storage medium for execution by the processor, the one or more instructions when executed by the processor are configured to:
  - determine, by the network device, during a Session Initiation Protocol (SIP) session between the network device and a second device, whether a refresh method is supported by the second device by sending a negotiation message to the second device indicating that the refresh method is supported, wherein a device that supports the refresh method is configured to determine whether a SIP session is active or inactive, and wherein the network device is configured to send a message with a body when the refresh method is not supported;
  - receive, at the network device, a response from the second device indicating whether the second device supports the refresh method;
  - based on the response from the second device indicating that the second device supports the refresh method, generate, by the network device, a first protocol message to initiate a refresh of the SIP session with the second device, wherein the first protocol message includes only a header configured with a refresh tag in a header field indicating that the first protocol message is a refresh message that is used to request a status of the SIP session;
  - send the first protocol message to the second device;
  - receive, in response to the first protocol message, a second protocol message from the second device, wherein the second protocol message is comprises a header and devoid of a body, the header of the second protocol message including the refresh tag and additional information indicating that the second protocol message is in response to the first protocol message; and
  - determine, using the network device and based on the information included in the second protocol message, whether the SIP session is active or inactive.

14. The network device of claim 13, wherein the first protocol message includes a reduced header that only includes mandatory fields as defined in SIP.

15. The network device of claim 13, wherein at least one of the first protocol message and the second protocol message does not include an SDP.

16. The network device of claim 13, wherein the second protocol message is a first type of message if the session is active and a second type of message if the session is inactive.

17. The network device of claim 16, wherein the first type of message is a modified version of a SIP 200 OK message and the second type of message is a modified version of a SIP 481 Call/Transaction does not exist message.

18. The network device of claim 13, wherein the first protocol message includes a header comprising a message field, From field, TO field, call-ID field, and Cseq field as defined in SIP.

19. A network device configured to refresh a session, the network device comprising:
- a processor;
- a non-transitory computer readable storage medium; and
- one or more instructions to be stored in the non-transitory computer readable storage medium for execution by the processor, the one or more instructions when executed by the processor are configured to:
  - receive, by the network device, during a Session Initiation Protocol (SIP) session between a first device and the network device, a negotiation message from the first device indicating that a refresh method is supported by the first device, wherein a device that supports the refresh method is configured to determine whether a SIP session is active or inactive, and wherein the first device is configured to send a message with a body when the refresh method is not supported;
  - send, by the network device, a response message to the first device indicating whether the network device supports the refresh method;
  - receive, at the network device, a first protocol message from the first device, wherein the first protocol message includes only a header configured with a refresh tag in a header field indicating that the first protocol message is a refresh message that is used to request a status of the SIP session with the first device is requested;
  - determine, by the network device and based on receiving the first protocol message, the status of the SIP session with the first device, wherein the status of the SIP session indicates whether the SIP session is active or inactive;
  - generate, by the network device, a second protocol message, wherein the second protocol message comprises a header and devoid of a body, the header of the second protocol message including the refresh tag and additional information indicating that the second protocol message is in response to the first protocol message, the header of the second protocol message further indicating the status of the SIP session; and
  - send the second protocol message to the first device.

20. The network device of claim 19, wherein the first protocol message and the second protocol message include a reduced header that only includes mandatory header fields as defined in SIP.

21. The network device of claim 19, wherein the second protocol message is a first type of message if the session is active and a second type of message if the session is inactive.

22. The network device of claim 21, wherein the first type of message is a modified version of a SIP 200 OK message and the second type of message is a modified version of a SIP 481 Call/Transaction does not exist message.

23. The network device of claim 19, wherein at least one of the first protocol message and the second protocol message does not include an SDP.

24. The network device of claim 19, wherein the first protocol message includes a header comprising a message field, From field, TO field, call-ID field, and Cseq field as defined in SIP.

25. An apparatus configured to refresh a session, the apparatus comprising:
- means for determining, by a first device, during a Session Initiation Protocol (SIP) session between the first device and a second device, whether a refresh method is supported by the second device by sending a negotiation message to the second device indicating that the refresh method is supported, wherein a device that supports the refresh method is configured to determine whether a SIP session is active or inactive, and wherein the first device is configured to send a message with a body when the refresh method is not supported;

a first instruction module including instructions that are executable by a first processor and configured to cause the first processor to perform operations including receiving, at the first device, a response from the second device indicating whether the second device supports the refresh method;

based on the response from the second device indicating that the second device supports the refresh method, means for generating, using the first device, a first protocol message to initiate a refresh of the SIP session with the second device, wherein the first protocol message includes only a header configured with a refresh tag in a header field indicating that the first protocol message is a refresh message that is used to request a status of the SIP session;

a second instruction module including instructions that are executable by a second processor and configured to cause the second processor to perform operations including:
sending the first protocol message from the first device to the second device; and
receiving, using the first device and in response to the first protocol message, a second protocol message from the second device, wherein the second protocol message comprises a header and devoid of a body, the header of the second protocol message including the refresh tag and additional information indicating that the second protocol message is in response to the first protocol message; and means for determining, using the first device and based on the information included in the second protocol message, whether the SIP session is active or inactive.

26. An apparatus configured to refresh a session, the apparatus comprising:

a first instruction module including instructions that are executable by a first processor and configured to cause the first processor to perform operations including:
receiving, by a second device, during a Session Initiation Protocol (SIP) session between a first device and the second device, a negotiation message from the first device indicating that a refresh method is supported by the first device, wherein a device that supports the refresh method is configured to determine whether a SIP session is active or inactive, and wherein the first device is configured to send a message with a body when the refresh method is not supported; and
sending, by a second device, a response message to the first device indicating whether the second device supports the refresh method;

means for receiving, using the second device, a first protocol message from the first device, wherein the first protocol message includes only a header configured with a refresh tag in a header field indicating that the first protocol message is a refresh message that is used to request a status of the SIP session with the first device is requested;

means for determining, using the second device and based on receiving the first protocol message, the status of the SIP session with the first device, wherein the status of the SIP session indicates whether the SIP session is active or inactive;

means for generating, using the second device, a second protocol message, wherein the second protocol message comprises a header and devoid of a body, the header of the second protocol message including the refresh tag and additional information indicating that the second protocol message is in response to the first protocol message, the header of the second protocol message further indicating the status of the SIP session; and a second instruction module including instructions that are executable by a second processor and configured to cause the second processor to perform operations including sending the second protocol message from the second device to the first device.

* * * * *